(12) United States Patent
Morris et al.

(10) Patent No.: US 11,713,743 B2
(45) Date of Patent: Aug. 1, 2023

(54) FLUME

(71) Applicant: Emrgy Inc., Atlanta, GA (US)

(72) Inventors: Emily A. Morris, Atlanta, GA (US); Madeleine M. White, Atlanta, GA (US); Brandon Steele, Decatur, GA (US); Thorsten Stoesser, London (GB)

(73) Assignee: EMRGY INC., Atlanta, GA (US)

( * ) Notice: Subject to any disclaimer, the term of this patent is extended or adjusted under 35 U.S.C. 154(b) by 0 days.

(21) Appl. No.: 16/824,470

(22) Filed: Mar. 19, 2020

(65) Prior Publication Data
US 2020/0300211 A1    Sep. 24, 2020

Related U.S. Application Data

(60) Provisional application No. 62/820,475, filed on Mar. 19, 2019.

(51) Int. Cl.
*F03B 17/06* (2006.01)
*F03B 15/04* (2006.01)

(52) U.S. Cl.
CPC ............ *F03B 17/065* (2013.01); *F03B 15/04* (2013.01)

(58) Field of Classification Search
CPC .............................. F03B 17/065; F03B 15/04
See application file for complete search history.

(56) References Cited

U.S. PATENT DOCUMENTS

| 6,109,863 A | 8/2000 | Milliken |
| 6,320,273 B1 | 11/2001 | Nemec |
| 6,793,458 B2 | 9/2004 | Kawai et al. |
| 7,944,075 B2 | 5/2011 | Boone |

(Continued)

FOREIGN PATENT DOCUMENTS

| CN | 103001454 A | 3/2013 |
| CN | 104393725 A | 3/2015 |

(Continued)

OTHER PUBLICATIONS

International Search Report & Written Opinion dated May 27, 2020 for International PCT Patent Appl. No. PCT/US2020/023693.

(Continued)

*Primary Examiner* — Viet P Nguyen
(74) *Attorney, Agent, or Firm* — Husch Blackwell LLP; Bryan D. Stewart; YiKai Chen

(57) ABSTRACT

A hydro-kinetic power generation system is disclosed. The system includes a structure to be positioned in shallow or deep waterways, such as canals and rivers. The structure may be modular, such that the structure may be composed of one or more structural units that are each substantially the same. In various embodiments, each unit includes one or more curved walls for accelerating water through the unit, or through the structure as a whole. In one embodiment, the accelerator walls are curved for optimizing water flow through the structure without generating undue head loss. In certain embodiments, the units may be configured such that the accelerator walls are positioned on opposite sides of the structure, or the accelerator walls may be adjacently positioned. Coupled to the structure are turbines and gear box systems for harnessing energy from the moving water and converting the energy into electric power.

21 Claims, 11 Drawing Sheets

(56) References Cited

U.S. PATENT DOCUMENTS

| | | |
|---|---|---|
| 8,246,299 B2 | 8/2012 | Razzell et al. |
| 8,616,829 B2 | 12/2013 | Becker et al. |
| 8,807,917 B2 | 8/2014 | Park et al. |
| 8,840,364 B2 | 9/2014 | Warton et al. |
| 8,876,448 B1 | 11/2014 | Hess et al. |
| 9,337,712 B2 | 5/2016 | Storaasli |
| 9,618,002 B1 | 4/2017 | Cabra et al. |
| 10,458,386 B2 | 10/2019 | Watanabe et al. |
| 2002/0197147 A1 | 12/2002 | Kawai et al. |
| 2004/0232702 A1 | 11/2004 | He et al. |
| 2007/0020097 A1 | 1/2007 | Ursua |
| 2007/0063520 A1 | 3/2007 | Ahmad |
| 2008/0018115 A1 | 1/2008 | Orlov |
| 2008/0084067 A1 | 4/2008 | Hill |
| 2008/0267777 A1 | 10/2008 | Lux |
| 2009/0091135 A1 | 4/2009 | Janca et al. |
| 2009/0129928 A1 | 5/2009 | Sauer |
| 2009/0167028 A1 | 7/2009 | Akamine |
| 2009/0230686 A1 | 9/2009 | Catlin |
| 2009/0315329 A1 | 12/2009 | Duffey et al. |
| 2010/0032952 A1 | 2/2010 | Hatch et al. |
| 2010/0084862 A1 | 4/2010 | Unno |
| 2010/0194112 A1 | 8/2010 | Vince |
| 2010/0253081 A1 | 10/2010 | Schlabach et al. |
| 2010/0295316 A1 | 11/2010 | Grassman |
| 2011/0037333 A1 | 2/2011 | Atallah et al. |
| 2011/0254271 A1 | 10/2011 | Freeman et al. |
| 2012/0223606 A1 | 9/2012 | Storaasli |
| 2013/0069369 A1 | 3/2013 | Salehpoor |
| 2013/0071240 A1 | 3/2013 | Chir et al. |
| 2013/0115045 A1 | 5/2013 | Korac |
| 2013/0134815 A1 | 5/2013 | Powell et al. |
| 2013/0266378 A1 | 10/2013 | French, Sr. |
| 2013/0285383 A1 | 10/2013 | Belarbi |
| 2013/0285384 A1 | 10/2013 | Schultz et al. |
| 2013/0334825 A1 | 12/2013 | Roter et al. |
| 2014/0138954 A1 | 5/2014 | Antonucci et al. |
| 2014/0161642 A1 | 6/2014 | Rajadhyaksha et al. |
| 2014/0183996 A1 | 7/2014 | He et al. |
| 2014/0265335 A1* | 9/2014 | Andreis .................... B63B 1/32 290/52 |
| 2015/0226174 A1 | 8/2015 | Duchene et al. |
| 2015/0343674 A1 | 12/2015 | Lowth et al. |
| 2016/0010620 A1 | 1/2016 | Han |
| 2016/0049855 A1 | 2/2016 | Davey et al. |
| 2017/0054384 A1 | 2/2017 | Post |
| 2017/0138333 A1 | 5/2017 | Toran |
| 2017/0298748 A1 | 10/2017 | Vetters et al. |
| 2018/0106236 A1 | 4/2018 | Lee |
| 2020/0025040 A1 | 1/2020 | Meyer et al. |

FOREIGN PATENT DOCUMENTS

| | | |
|---|---|---|
| EP | 1849999 A2 | 10/2007 |
| GB | 2408778 A | 6/2005 |
| RU | 2216662 C1 | 11/2003 |
| WO | 2006133703 A1 | 12/2006 |
| WO | 2011095240 A2 | 8/2011 |
| WO | 2011160210 A2 | 12/2011 |
| WO | 2013143596 A1 | 10/2013 |
| WO | 2016004506 A1 | 1/2016 |

OTHER PUBLICATIONS

International Search Report and Written Opinion dated Dec. 22, 2016 for International Application No. PCT/US2016/057130.

Davey, "Axial Flux Cycloidal Magnetic Gears", IEEE Transactions on Magnetics 50:4, 2014, 8100607, 7 pages.

International Search Report and Written Opinion dated Jan. 3, 2019 for International Application No. PCT/US2018/051371.

International Search Report and Written Opinion dated Jun. 22, 2017 for International Application No. PCT/US17/24511.

Extended European Search Report dated Oct. 28, 2019 for European Pat. Appl. No. 17776448.7.

* cited by examiner

FLUME

CROSS REFERENCE TO RELATED APPLICATIONS

This application claims the benefit of, and priority to, U.S. Provisional Patent App. No. 62/820,475, filed on Mar. 19, 2019, and entitled "FLUME," the disclosure of which is incorporated by reference, as if the same were set forth herein in its entirety.

This application further incorporates by reference the following U.S. and international patent applications:
- U.S. patent application Ser. No. 15/294,074, filed on Oct. 14, 2016, and entitled "CYCLOIDAL MAGNETIC GEAR SYSTEM";
- International Patent App. No. PCT/US2016/057130, filed on Oct. 14, 2016, and entitled "CYCLOIDAL MAGNETIC GEAR SYSTEM";
- International Patent App. No. PCT/US17/24511, filed on Mar. 28, 2017, and entitled "TURBINE HYDROKINETIC ENERGY SYSTEM UTILIZING CYCLOIDAL MAGNETIC GEARS"; and
- U.S. Provisional Patent App. No. 62/687,520, filed on Jun. 20, 2018, and entitled "CASSETTE."

TECHNICAL FIELD

The present disclosure relates generally to hydro-electric power systems, and more specifically to systems, methods, and apparatuses for accelerating fluid through hydro-electric power generation systems.

BACKGROUND

Conventional hydro-electric power generation systems convert energy from naturally moving water into electric power. However, the amount of power conventional systems generate is limited by the natural flow or speed of the water. Therefore, there exists a long-felt but unresolved need for systems, methods, and apparatuses for accelerating fluid through hydro-electric power generation systems for increasing power generation.

BRIEF SUMMARY OF THE DISCLOSURE

The present disclosure relates generally to a flume structure for increasing the velocity of a fluid moving through the flume structure in a channel, canal, waterway (deep or shallow), etc. More specifically, the flume structure includes one or more side walls and a base with specially curved designs for increasing the velocity of water flowing through the flume.

For example, consider a shallow waterway with a stream having a particular flow rate. In particular embodiments, the flume design reduces the available waterway width for the stream to occupy, and, given that fluids are incompressible, the velocity of the fluid increases to maintain the flowrate through the narrowed pathway. In one embodiment, the potential energy of the increased fluid velocity may be harnessed via turbines for generating electricity, as is described in the PCT Patent App. No. PCT/US2017/024511, filed Mar. 28, 2017, entitled "TURBINE HYDROKINETIC ENERGY SYSTEM UTILIZING CYCLOIDAL MAGNETIC GEARS," which is incorporated by reference in its entirety herein.

In certain embodiments, the flume design allows for optimal fluid velocity increase, resulting in optimal energy generation. In a particular embodiment, flume accelerator walls (side walls) may be designed such that the water displacement (e.g., narrowing of the canal/waterway) is enough to increase the velocity of the water to a substantial degree, but also that the height of the water is not increased such that the velocity of the water substantially decreases (head loss increases water depth which can reduce velocity). According to various aspects of the present disclosure, the design of the flume accelerator side walls may include exemplary geometric aspects and ratios such as: an apex of the side wall that extends into the flume within a range of about 0.23-0.25 times the width of a single flume unit; the apex of the sidewall is slightly forward from the center of the side wall width, and is also slightly forward from the position of the turbine; a front angle opposite of the apex height (e.g., from the front corner of the flume to the apex) is greater than a back angle opposite of the apex height (e.g., from the back corner of the flume to the apex), where the front angle is greater than the back angle by a factor of about 1.2; the location (depth) of the turbine from the front of the flume is further than the location of the apex by a factor of about 1.14. Furthermore, in some embodiments, flumes may be installed in various orientations (inner and outer orientations) that allow for the curved sidewalls to join in the middle of a waterway (effectively forming an accelerating divider/median in the flume) or the curved sidewalls may be oriented along the outer borders of the flume (effectively accelerating the water inward and through the flume). In one embodiment, the area/volume exterior of the accelerator side walls may be hollow, and furthermore connecting two flume units at the curved sidewalls may form a hollowed space within the divider/median. In other embodiments, the hollow area/volume exterior of the curved side walls may join with the walls or banks of the shallow waterway.

In particular embodiments, the exemplary flume discussed herein may include a top wall (also referred to herein as a "top"). In various embodiments, the top wall may allow for a turbine and gear box to be mounted to the top wall. In one embodiment, the top wall may be designed such that the top wall does not cover the entirety of the flume base, but rather only a portion, such as the rear/back portion of the base. Accordingly, and in one embodiment, a vertical beam at the rear of the flume base may provide structural support to the top wall and the mounted gear box(es). In some embodiments, the vertical beam may include a curved design for further increasing the velocity of the fluid flowing through the flume. Furthermore, the flume top wall may include a "slot" along the front face of the top wall that may allow for turbines to be installed via a lateral movement (e.g., the turbine is slid sideways into the slot) rather than a vertical drop (e.g., the turbine is raised and lowered into place via a crane or the like), which may increase installation efficiency. However, in particular embodiments, the flume top wall may include a "cut-out" or vacant area on the upper surface of the top wall that may allow for the turbines to be installed via a vertical movement (e.g., the turbine is dropped into position).

In one embodiment, the geometric aspects and ratios discussed above allow for the accelerator walls to leverage unique patterns of flow distribution between the walls and the turbines, which constrict and accelerate water flowing through the flume. In various embodiments, the low drag of the accelerator wall shape accelerates the water without adding undue head loss. In particular embodiments, the location of the turbine blades relative to the wall (and the apex of the wall) is optimized for increasing the flow velocity.

In a particular embodiment, the accelerator wall leverages asymmetry of power production, where a substantial amount of generated power is derived from one side of the flow, and the flow is accelerated more on the power producing side (e.g., the side nearest the accelerator wall, where water pushes a vertical turbine) than the non-powered side.

According to various aspects of the present disclosure, the flume may prevent or mitigate an increase in head loss by further manipulating the water flowing through the flume via vertical constriction. In one embodiment, the flume walls may be designed such that as the height of the flowing water is increased via the accelerator walls, the increase in height is distributed away from the flume turbines. For example, the flume walls may be designed to form a funnel-like entrance into the flume, where the cross-sectional area of the funnel narrows closer to the turbines. In a particular embodiment, the increased water height provides downward pressure in the direction of the turbine blades, thus increasing the velocity of the water flowing through the flume turbines. In certain embodiments, a separate wall extending outwardly from the flume may provide the vertical constriction on the flowing water. In various embodiments, the separate wall may extend upward linearly (e.g., at a constant angle) or the wall may include an upward curve (e.g., at an increasing angle). In particular embodiments, the separate wall may be integrally attached to the front face of the flume at any appropriate location (e.g., near the bottom of the flume, near center-height of the flume, etc.), based on the particular waterway and other factors (e.g., historical water levels during floods, etc.).

According to a first aspect, a waterway turbine system including: A) a base including: 1) a front edge positioned to receive water; and 2) a back edge positioned to release water; B) a top; C) a vertical turbine extending from the top to the base and positioned at about a midpoint between the front edge and the back edge of the base; and D) a side wall extending upwardly from a left or right side of the base and fixed to the top, the side wall including a curvature for increasing a velocity of a fluid flowing over the base, wherein the curvature includes an apex positioned closer to the front edge of the base than the back edge of the base.

According to a second aspect, the waterway turbine system of the first aspect or any other aspect, wherein the vertical turbine is positioned further from the front edge than the position of the apex by a factor of about 1.14.

According to a third aspect, the waterway turbine system of the second aspect or any other aspect, wherein: A) the side wall and the base form: 1) a front corner at the intersection of the front edge of the base and the side wall; 2) a back corner at the intersection of the back edge of the base and the side wall; and B) an angle of the side wall curvature relative to the front corner is greater than an angle relative to the back corner.

According to a fourth aspect, the waterway turbine system of the third aspect or any other aspect, wherein a front angle of the side wall is about 27 degrees relative to the front corner of the base and a back angle of about 23 degrees relative to the back corner of the base.

According to a fifth aspect, the waterway turbine system of the fourth aspect or any other aspect, wherein the angle of the side wall curvature relative to the front corner is greater than the angle relative to the back corner by a factor of about 1.2.

According to a sixth aspect, the waterway turbine system of the fifth aspect or any other aspect, wherein: A) the front edge of the base is a particular length; B) the base, the side wall, and the top form an interior; and C) the apex extends into the interior about 0.23-0.025 times the particular length.

According to a seventh aspect, the waterway turbine system of the sixth aspect or any other aspect, wherein: A) the side wall extends upwardly from the right side of the base; B) the waterway turbine system includes a second wall extending upwardly from the left side of the base; and C) the second wall is substantially flat and perpendicular to the base.

According to an eighth aspect, the waterway turbine system of the seventh aspect or any other aspect, wherein: A) the side wall extends upwardly from the left side of the base; B) the waterway turbine system includes a second wall extending upwardly from the right side of the base; and C) the second wall is substantially flat and perpendicular to the base.

According to a ninth aspect, the waterway turbine system of the eighth aspect or any other aspect, wherein the base, the side wall, and the top are a unitary structure.

According to a tenth aspect, the waterway turbine system of the eighth aspect or any other aspect, wherein the base, the side wall, and the top include thermoformed plastic structures.

According to an eleventh aspect, the waterway turbine system of the eighth aspect or any other aspect, wherein the base, the side wall, and the top include a filled mesh.

According to a twelfth aspect, the waterway turbine system of the eighth aspect or any other aspect, wherein the base, the side wall, and the top include concrete.

According to a thirteenth aspect, the waterway turbine system of the eighth aspect or any other aspect, wherein the base and the side wall include concrete and the top includes metal.

According to a fourteenth aspect, a waterway turbine system including: A) a base including: 1) a front edge positioned to receive water; and 2) a back edge positioned to release water; B) a side wall extending upwardly from a left or right side of the base and including a curvature with an apex for increasing a velocity of a fluid flowing over the base; C) a top integrally formed with the side wall; and D) a vertical turbine extending from the top to the base and substantially positioned at a midpoint between the front edge and back edge of the base.

According to a fifteenth aspect, the waterway turbine system of the fourteenth aspect or any other aspect, wherein the apex is positioned closer to the front edge of the base than the back edge of the base.

According to a sixteenth aspect, the waterway turbine system of the fourteenth aspect or any other aspect, wherein the vertical turbine is positioned further from the front edge than the position of the apex by a factor of about 1.14.

According to a seventeenth aspect, the waterway turbine system of the fourteenth aspect or any other aspect, wherein: A) the side wall and the base form: 1) a front corner at the intersection of the front edge of the base and the side wall; and 2) a back corner at the intersection of the back edge of the base and the side wall; and B) an angle of the side wall curvature relative to the front corner is greater than an angle relative to the back corner.

According to a eighteenth aspect, the waterway turbine system of the seventeenth aspect or any other aspect, wherein a front angle of the side wall is about 27 degrees relative to the front corner of the base and a back angle of about 23 degrees relative to the back corner of the base.

According to a nineteenth aspect, the waterway turbine system of the seventeenth aspect or any other aspect, wherein the angle of the side wall curvature relative to the front corner is greater than the angle relative to the back corner by a factor of about 1.2.

According to a twentieth aspect, the waterway turbine system of the fourteenth aspect or any other aspect, wherein: A) the front edge of the base is a particular length; B) the base, the side wall, and the top form an interior; and C) the apex extends into the interior about 0.23-0.025 times the particular length.

According to a twenty-first aspect, the waterway turbine system of the fourteenth aspect or any other aspect, wherein: A) the side wall extends upwardly from the right side of the base; B) the waterway turbine system includes a second wall extending upwardly from the left side of the base; and C) the second wall is substantially flat and perpendicular to the base.

According to a twenty-second aspect, the waterway turbine system of the fourteenth aspect or any other aspect, wherein: A) the side wall extends upwardly from the left side of the base; B) the waterway turbine system includes a second wall extending upwardly from the right side of the base; and C) the second wall is substantially flat and perpendicular to the base.

These and other aspects, features, and benefits of the claimed embodiment(s) will become apparent from the following detailed written description of the embodiments and aspects taken in conjunction with the following drawings, although variations and modifications thereto may be effected without departing from the spirit and scope of the novel concepts of the disclosure.

BRIEF DESCRIPTION OF FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF DRAWINGS

Figure 1:
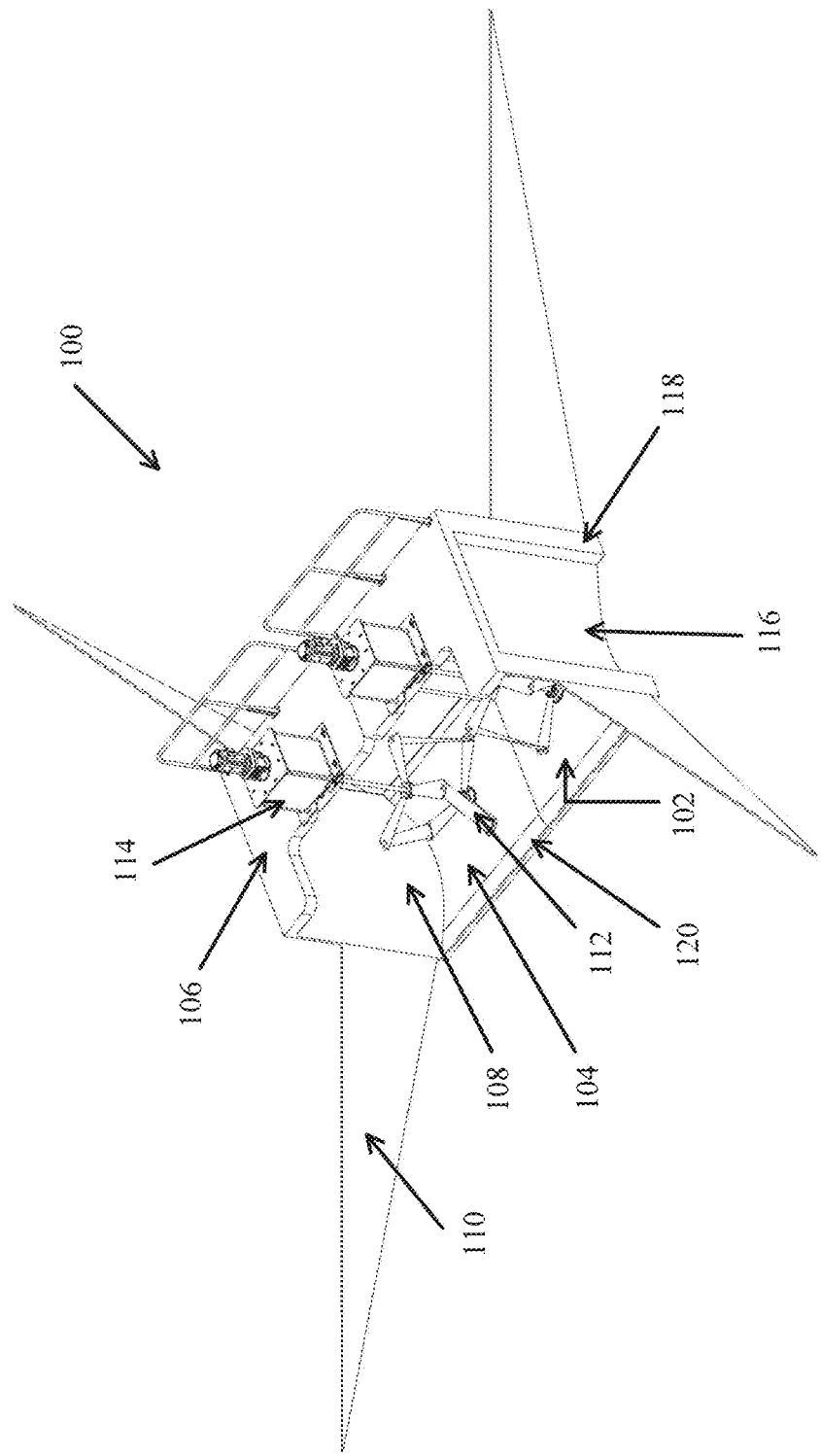
FIG. 1 is a perspective view of the flume system, according to one aspect of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Overview

Briefly described, and according to one embodiment, aspects of the present disclosure relate generally to a hydrokinetic power generation system for increasing the velocity of a fluid moving through the flume structure in a channel, canal, waterway (deep or shallow), etc. More specifically, this system, also referred to herein as a flume structure, flume system, or the like, includes one or more side walls and a base with specifically curved designs for increasing the velocity of water flowing through the flume.

For example, consider a shallow waterway with a stream having a particular flow rate. In particular embodiments, the flume design reduces the available waterway width for the stream to occupy, and, given that fluids are incompressible, the velocity of the fluid increases to maintain the flowrate through the narrowed pathway. In one embodiment, the potential energy of the increased fluid velocity may be harnessed via turbines for generating electricity, as is described in the PCT Patent App. No. PCT/US2017/024511, filed Mar. 28, 2017, entitled "TURBINE HYDROKINETIC ENERGY SYSTEM UTILIZING CYCLOIDAL MAGNETIC GEARS," which is incorporated by reference in its entirety herein.

In certain embodiments, the flume design allows for optimal fluid velocity increase, resulting in optimal energy generation. In a particular embodiment, the flume accelerator walls (side walls) may be designed such that the water displacement (e.g., narrowing of the canal/waterway) is enough to increase the velocity of the water to a substantial degree, but also that the height of the water is not increased such that the velocity of the water decreases (head loss increases water depth which reduces velocity). According to various aspects of the present disclosure, the design of the flume accelerator side walls may include exemplary geometric aspects and ratios such as: an apex of the side wall that extends into the flume within a range of about 0.23-0.25 times the width of a single flume unit; the apex of the sidewall is slightly forward from the center of the side wall width, and is also slightly forward from the position of the turbine; a front angle opposite of the apex height (e.g., from the front corner of the flume to the apex) is greater than a back angle opposite of the apex height (e.g., from the back corner of the flume to the apex), where the front angle is greater than the back angle by a factor of about 1.2; the location (depth) of the turbine from the front of the flume is further than the location of the apex by a factor of about 1.14. Furthermore, in some embodiments, flumes may be installed in various orientations (inner and outer orientations) that allow for the curved sidewalls to join in the middle of a waterway (effectively forming an accelerating divider/median in the flume) or the curved sidewalls may be oriented along the outer borders of the flume (effectively accelerating the water inward and through the flume). In one embodiment, the area/volume exterior of the accelerator side walls may be hollow, and furthermore connecting two flume units at the curved sidewalls may form a hollowed space within the divider/median. In other embodiments, the hollow area/volume exterior of the curved side walls may join with the walls or banks of the shallow waterway.

In particular embodiments, the exemplary flume discussed herein may include a top wall. In various embodiments, the top wall may allow for a turbine and gear box to be mounted to the top wall. In one embodiment, the top wall may be designed such that the top wall does not cover the entirety of the flume base, but rather only a portion, such as the rear portion of the base. Accordingly, and in one embodiment, a vertical beam at the rear of the flume base may provide structural support to the top wall and the mounted gear box(es). In some embodiments, the vertical beam may include a curved design for further increasing the velocity of the fluid flowing through the flume. Furthermore, the flume top wall may include a "slot" along the front face of the top wall that may allow for turbines to be installed via a lateral movement (e.g., the turbine is slid sideways into the slot) rather than a vertical drop (e.g., the turbine is raised and lowered into place via a crane or the like), which increases the installation efficiency. However, in particular embodiments, the flume top wall may include a "cut-out" or vacant area on the upper surface of the top wall that may allow for the turbines to be installed via a vertical movement (e.g., the turbine is dropped into position).

In one embodiment, the geometric aspects and ratios discussed above allow for the accelerator walls to leverage unique patterns of flow distribution between the walls and the turbines, which constrict and accelerate water flowing through the flume. In various embodiments, the low drag of the accelerator wall shape accelerates the water without adding undue head loss. In particular embodiments, the location of the turbine blades relative to the wall (and the apex of the wall) is optimized for increasing the flow velocity.

In a particular embodiment, the accelerator wall leverages asymmetry of power production, where a substantial amount of generated power is derived from one side of the flow, and the flow is accelerated more on the power producing side than the non-powered side.

According to various aspects of the present disclosure, the flume may prevent or mitigate an increase in head loss by further manipulating the water flowing through the flume via vertical constriction. In one embodiment, the flume walls may be designed such that as the height of the flowing water is increased via the accelerator walls, the increase in height is distributed away from the flume turbines. For example, the flume walls may be designed to form a funnel-like entrance into the flume, where the cross-sectional area of the funnel narrows closer to the turbines. In a particular embodiment, the increased water height provides downward pressure in the direction of the turbine blades, thus increasing the velocity of the water flowing through the flume turbines. In certain embodiments, a separate wall extending outwardly from the flume may provide the vertical constriction on the flowing water. In various embodiments, the separate wall may extend upward linearly (e.g., at a constant angle) or the wall may include an upward curve (e.g., at an increasing angle). In particular embodiments, the separate wall may be integrally attached to the front face of the flume at any appropriate location (e.g., near the bottom of the flume, near center-height of the flume, etc.), based on the particular waterway and other factors (e.g., historical water levels during floods, etc.).

Exemplary Embodiments

Referring now to the figures, FIG. 1 is a perspective view of the flume system 100, according to one aspect of the present disclosure. In various embodiments, the flume system 100 may be installed in waterways (deep or shallow) for directing water flow through the flume system 100 for converting kinetic energy from the water flow into electric power via one or more turbines. In particular embodiments, the flume system 100 includes one or more flume units 102, where the one or more flume units 102 may include a base 104, a top wall 106, and an accelerator wall 108. As discussed in the U.S. Non-Provisional patent application Ser. No. 16/133,285, filed on Sep. 17, 2019, and entitled "HYDRO TRANSITION SYSTEMS AND METHODS OF USING THE SAME," one or more hydro-transition walls 110 may direct water flow into the flume system 100 for further acceleration by the accelerator walls 108. Accordingly, the accelerated water flow spins one or more turbines 112 positioned within the flume, thus generating hydroelectric power via one or more gear boxes 114 coupled to the one or more turbines 112.

Continuing with FIG. 1, and as will be described in further detail herein, the accelerator walls 108 protrude inwardly towards the center of the flume system 100, and include a substantially curved shape optimized for accelerating fluid flow through the flume 100. In certain embodiments, the accelerator walls 108 may be manufactured from a composite material, such as fiber glass or the like, or the accelerator walls 108 may be manufactured from cement, or a similar material. In some embodiments, and as shown in the present embodiment, the accelerator walls 108 include a hollowed or concave rear surface 116 surrounded by a substantially flat frame 118 that may be joined with another accelerator wall 108 (as discussed below in association with the embodiments shown in FIGS. 10 and 11), or the substantially flat frame 118 may be positioned along the perimeter of a waterway.

Still referring to FIG. 1, and in various embodiments, the base 104 includes a curved lip 120, or front edge. In particular embodiments, the curved lip 120 allows for water flowing along the bottom of a waterway to pass over the front of the base 104 without creating undue turbulence around the front of the flume system 100. Furthermore, as water flows over the leading edge and along the curved lip's surface, the water is accelerated, as it needs to travel along a greater distance (e.g., the distance of the curved lip) while still maintaining its velocity. Accordingly, the curved lip 120 contributes to the water's acceleration through the flume system 100.

Accordingly, in various embodiments, the flume system 100 and its components allow for enhanced hydro-electric power generation. In one embodiment, the flume system 100 receives water-flow from a waterway such as a canal, river, etc. In one embodiment, the water is received at the front of the flume system 100, particularly at the curved lip 120 (the front edge). According to various aspects of the present disclosure, the curved front lip 120 accelerates the water-flow as it enters the flume system 100. In various embodiments, in response to the water-flow being accelerated by the curved lip 120 and entering the flume system 100, the one or more accelerator walls 108 further accelerate the water-flow. In particular embodiments, the one or more accelerator walls 108 accelerate the water-flow via a curved wall face that gradually protrudes further into the flume system 100 interior, thus reducing the area through which the water may flow. In certain embodiments, the apex of the accelerator wall 108 protrudes a distance that effectively reduces the area through which water may flow by about a factor of 0.23-0.25 (discussed in greater detail below in association with FIG. 6).

According to various aspects of the present disclosure, the one or more turbines 112 are positioned slightly behind the apex of the accelerator wall 108. Accordingly, the one or more turbines 112 receive an accelerated water-flow in response to the water-flow passing the accelerator wall 108 apex peak. In one embodiment, in response to the one or more turbines 112 receiving the water-flow, the turbines 112 spin along a vertically aligned axis, and the one or more gear boxes 114 generate hydro-electric power from the turbine 112 rotations.

In certain embodiments, the water-flow continues through the flume system 100 and passes over a back edge on the base 104. In various embodiments, the back edge allows for the water-flow to transition out from the flume system 100 back into the canal or waterway without undue turbulence. According to various aspects of the present disclosure, a subsequent flume system may be further downstream, and reducing undue turbulence allows for downstream flume systems to receive water at a high velocity.

Figure 2:
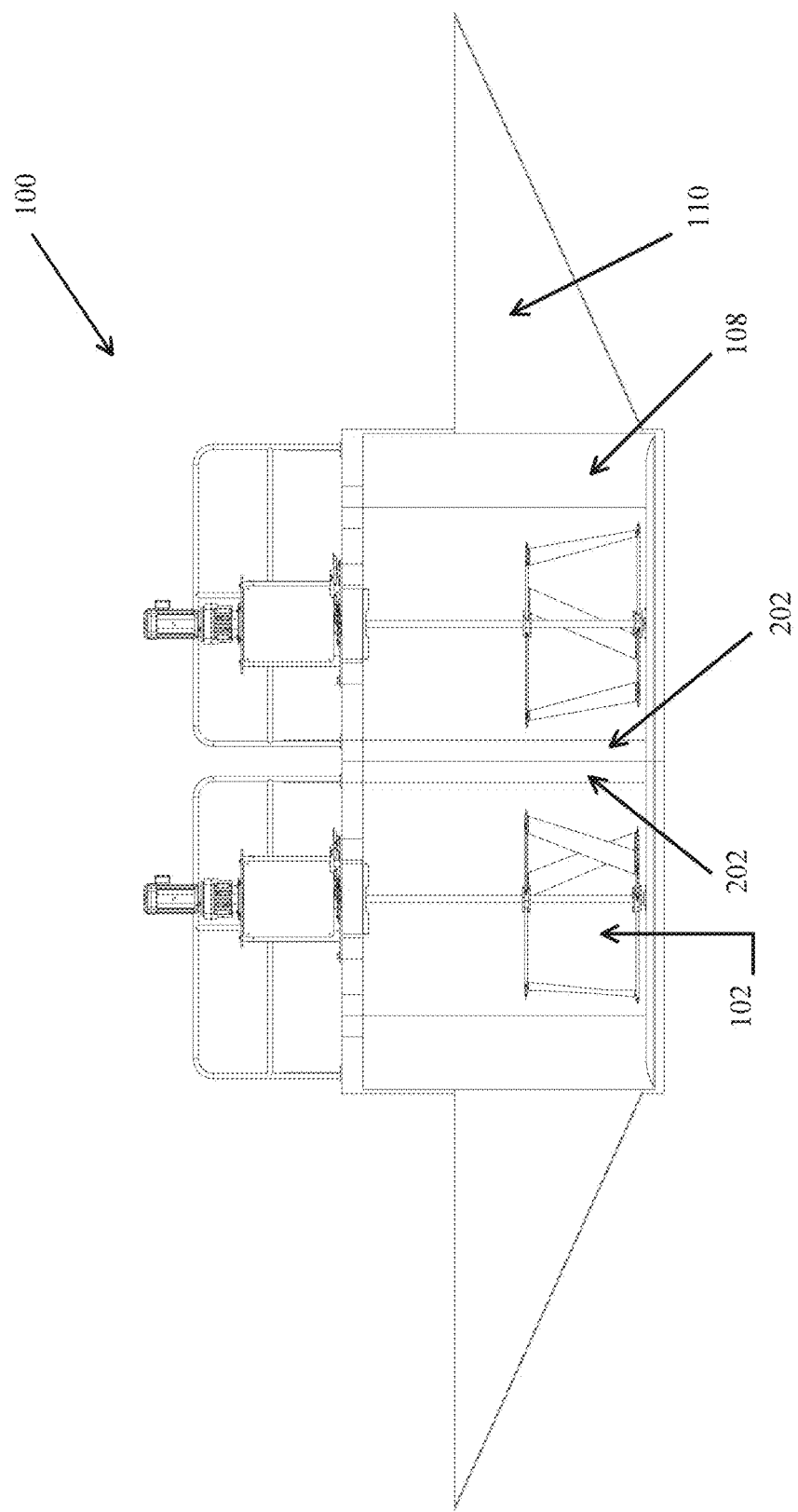
FIG. 2 is a front view of the flume system, according to one aspect of the present disclosure.

FIG. 2 is a front view of the flume system 100, according to one aspect of the present disclosure. In one embodiment, the flume system 100 may be installed in a trapezoidal canal or waterway, and thus the hydro-transitions 110 are triangularly shaped for accommodating the trapezoidal shape of its installation environment. In some embodiments, the flume system 100 may be installed in a rectangular waterway or canal, and in these embodiments the hydro-transitions 110 may be more rectangular in shape (or the system may not use transitions). According to various aspects of the present disclosure, each flume unit 102 may include a curved support beam 202. In particular embodiments, the curved support beam 202 is configured to support the load/weight from the top wall 106 while also mitigating any turbulence created by its presence, via its curved shape. Similar to the curved lip 120, the curved support beam 202 may accelerate water as it flows around the beam 202. In certain embodiments, curved support beams 202 from multiple flume units 102 may be positioned such that they form a divider or median in the center of a flume system 100 and between two accelerator walls 108.

Figure 3:
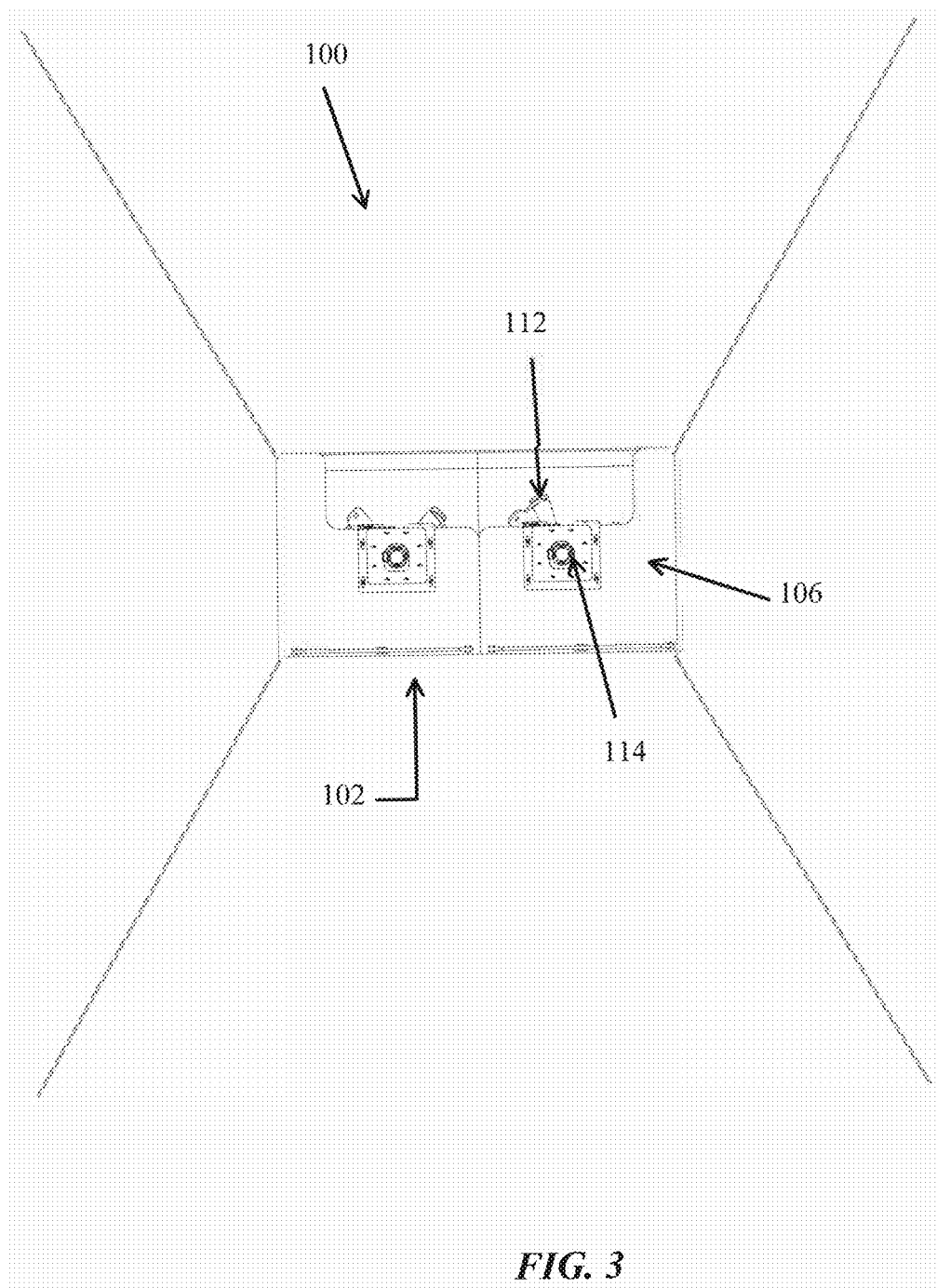
FIG. 3 is a top view of the flume system, according to one aspect of the present disclosure.

FIG. 3 is a top view of the flume system, according to one aspect of the present disclosure. In certain embodiments, the top walls 106 of the flume system 100 may be substantially "L-shaped," or another appropriate shape, for reducing the weight of the top wall 106 while also allowing for the turbines 112 and gear boxes 114 to be positioned on top of/within the flume units 102. In particular embodiments, the gear boxes 114 may include a frame with holes for accepting screws that may be fastened into (or bolted onto) the top wall 106 for securing the gear box 114 onto the flume system 100.

Figure 4:
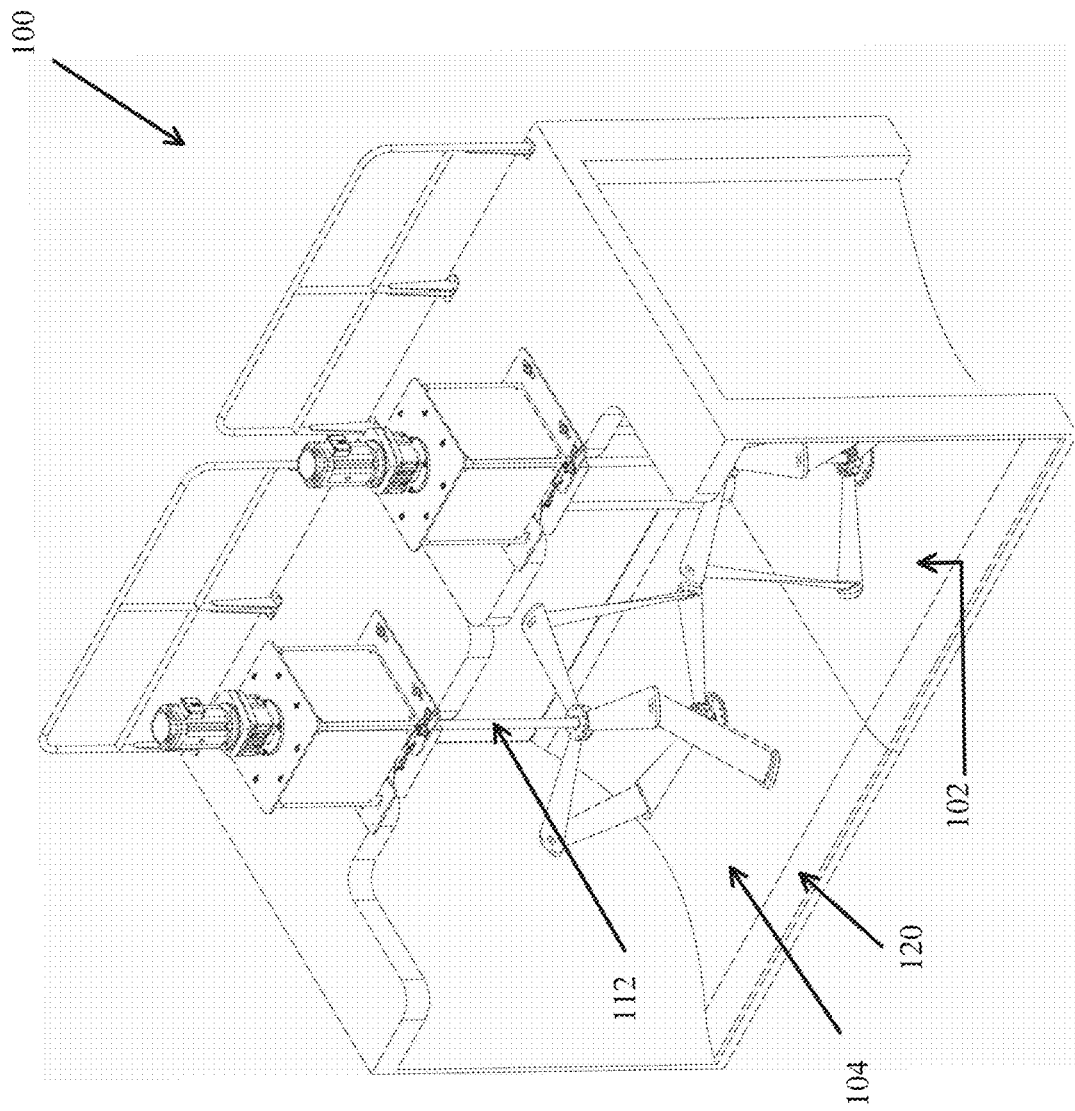
FIG. 4 is a perspective view of the flume system, according to one aspect of the present disclosure.

Turning now to FIG. 4, a perspective view of the flume system 100 is shown, according to one aspect of the present disclosure. As mentioned above in association with the discussion of FIG. 1, the flume system 100 includes a base 104 with a curved base lip 120. In particular embodiments, the curved base lip 120 accelerates water upward into the flume system 100, thus increasing the system's hydro-kinetic power output. Furthermore, each flume unit 102 may include one or more accelerator walls 108 that protrude inwardly towards the turbine(s) 112, thus narrowing the area through which water may flow and increasing the velocity of the water for increasing the system's power output.

Figure 5:
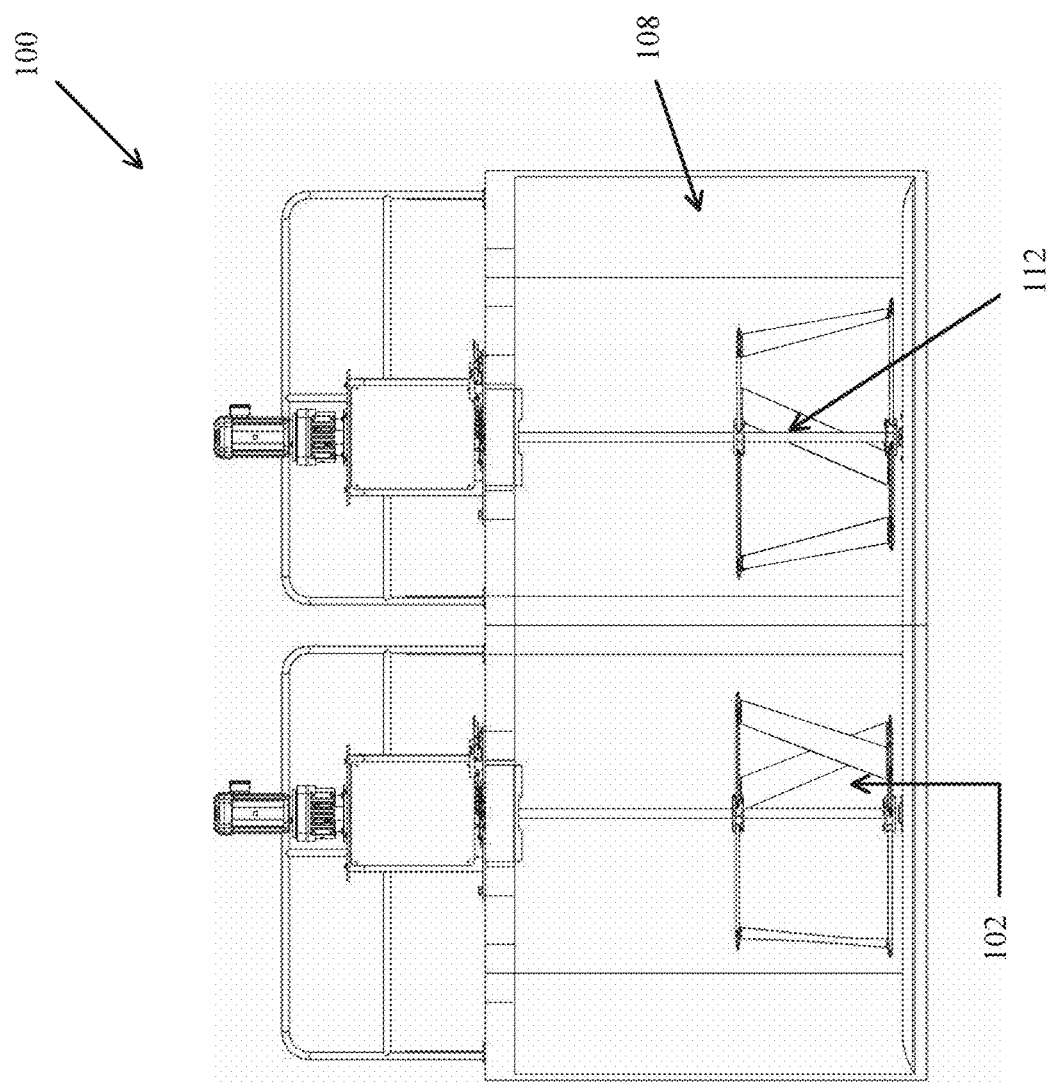
FIG. 5 is a front view of the flume system, according to one aspect of the present disclosure.

FIG. 5 is a front view of the flume system 100, according to one aspect of the present disclosure. In various embodiments, the accelerator walls 108 protrude inwardly towards the one or more turbines 112. In a particular embodiment, at the peak curve apex of each accelerator wall 108, the accelerator wall 108 reduces the available width of the interior of the flume unit 102 (through which water may flow) by about 0.23-0.25 times its full width.

Figure 6:
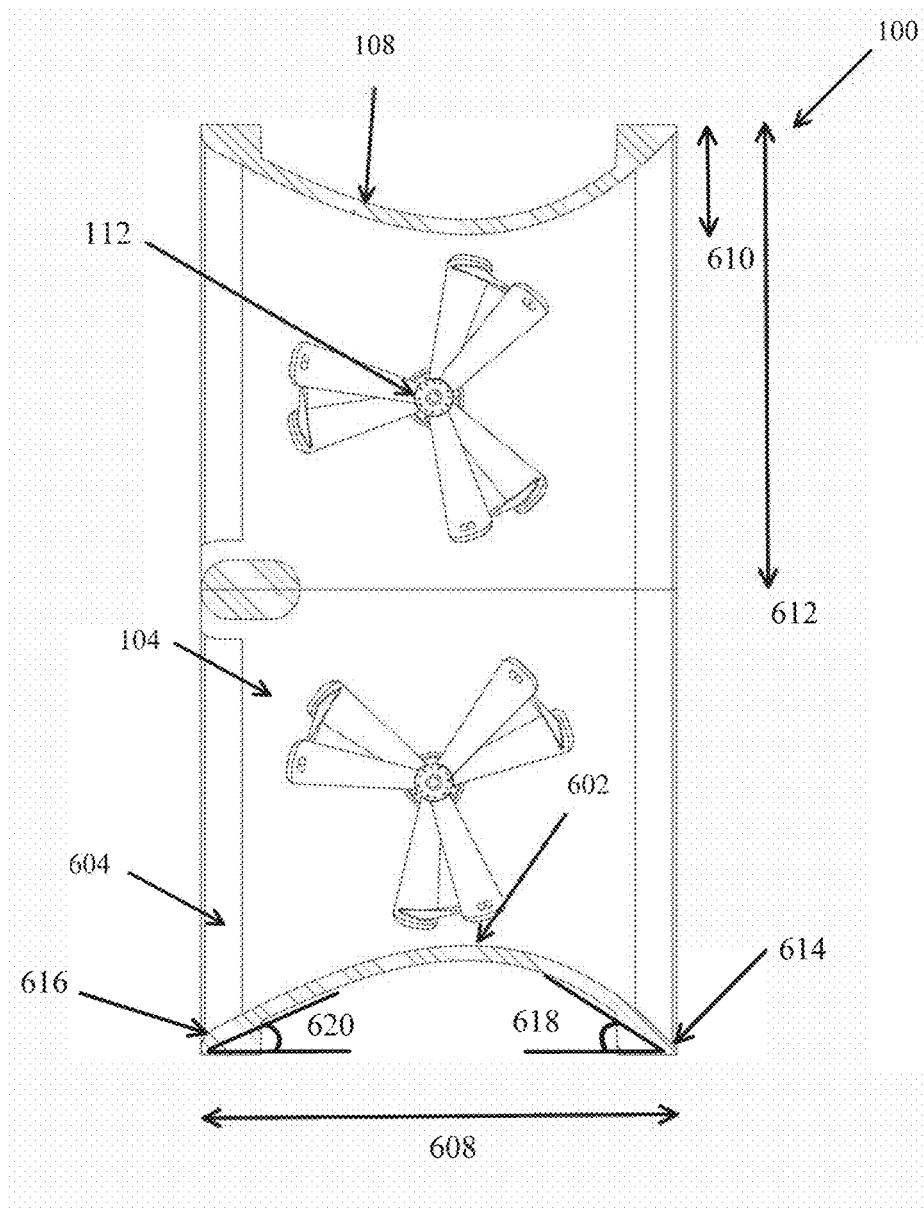
FIG. 6 is a top cross-sectional view of the flume system, according to one aspect of the present disclosure.

Turning now to FIG. 6, a top cross-sectional view of the flume system 100 is shown according to one aspect of the present disclosure. In various embodiments, the configuration of the accelerator wall 108 curvature is optimized for increasing the velocity of water flowing through the flume system 100. In certain embodiments, aspects such as the position of the apex peak 602 with respect to the turbine 112, as well as the position of the apex peak 602 with respect to the width of the accelerator wall 108 (indicated as width 608), contribute to the optimization of water flow through the flume system 100. In one embodiment, the apex of the accelerator wall 108 extends into the flume within a range of about 0.23-0.25 times the width of a single flume unit 102 (indicated as widths 610 and 612, respectively). In particular embodiments, the apex of the accelerator wall 108 is slightly forward from the center of the width 608, and is also slightly forward from the position of the turbine 112. In certain embodiments, the turbine 112 is positioned slightly behind the center of the width 608. In various embodiments, a front angle 618 opposite of the apex height (e.g., from the front corner 614 of the flume to the apex 602) is greater than a back angle 620 opposite of the apex height (e.g., from the back corner 616 of the flume to the apex 602), where the front angle 618 is greater than the back angle 620 by a factor of about 1.2. In at least one embodiment, the location (depth) of the turbine 112 from the front of the flume is further than the location of the apex 602 by a factor of about 1.14.

Still referring to FIG. 6, a back edge 604 of the base 104 is shown, according to various aspects of the present disclosure. In particular embodiments, the back edge 604 may include a curvature that is substantially similar to the front edge (the curved lip 120). In one embodiment, the back edge 604 provides a gradually declining surface for water to flow over as the water flows through the flume system 100. Accordingly, the back edge 604 reduces turbulences, or the like, from beginning at and around the rear of the flume system 100, and thus promotes continued water flow down the waterway.

Figure 7:
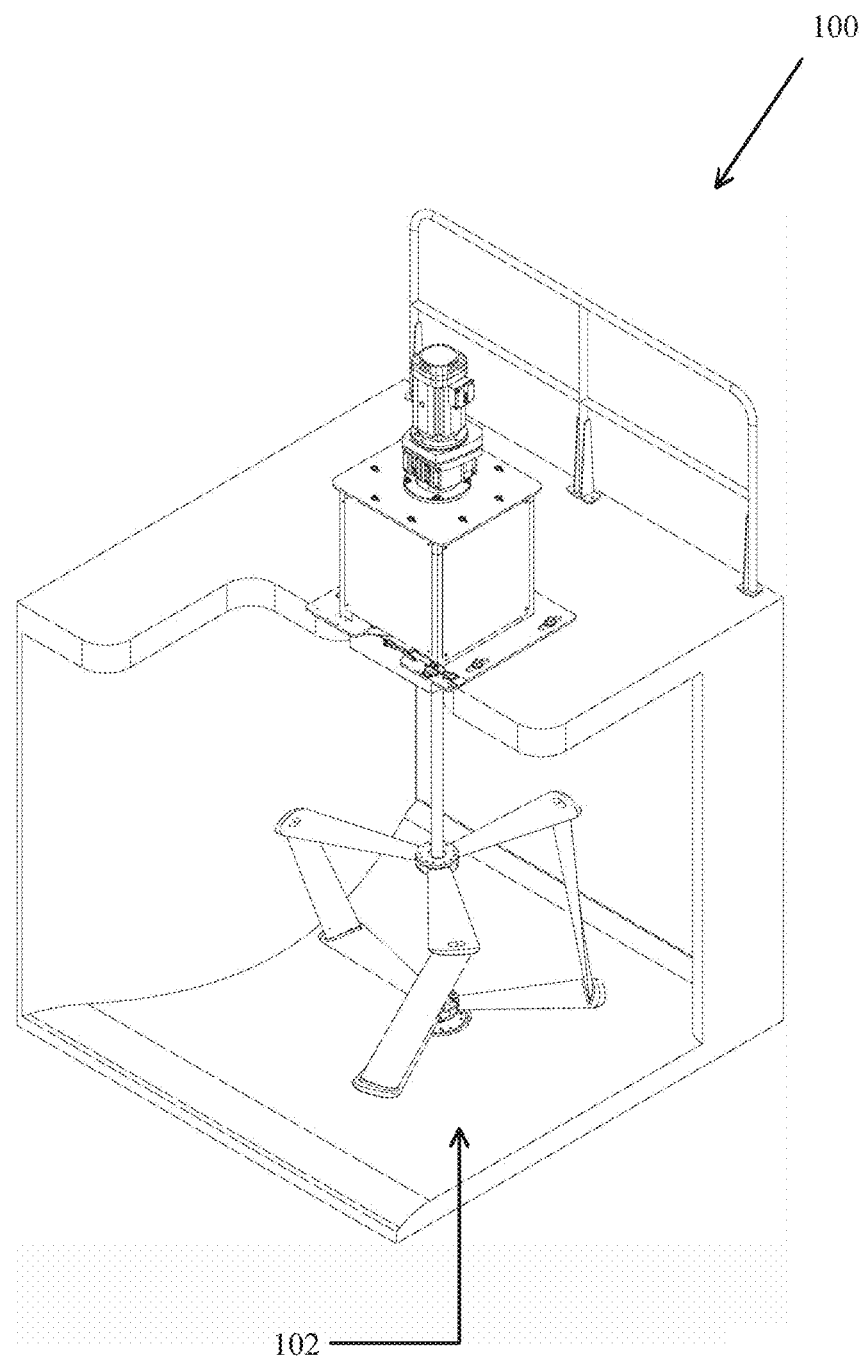
FIG. 7 is a perspective view of the flume system, according to one aspect of the present disclosure.

Proceeding now to FIG. 7, a perspective view of the flume system 100 is shown according to one aspect of the present disclosure. In the present embodiment, the flume system 100 shown includes only a single flume unit. In one embodiment, single flume units 102 may be installed intermittently throughout waterways, or in narrow waterways, for harnessing kinetic energy from flowing water.

Figure 8:
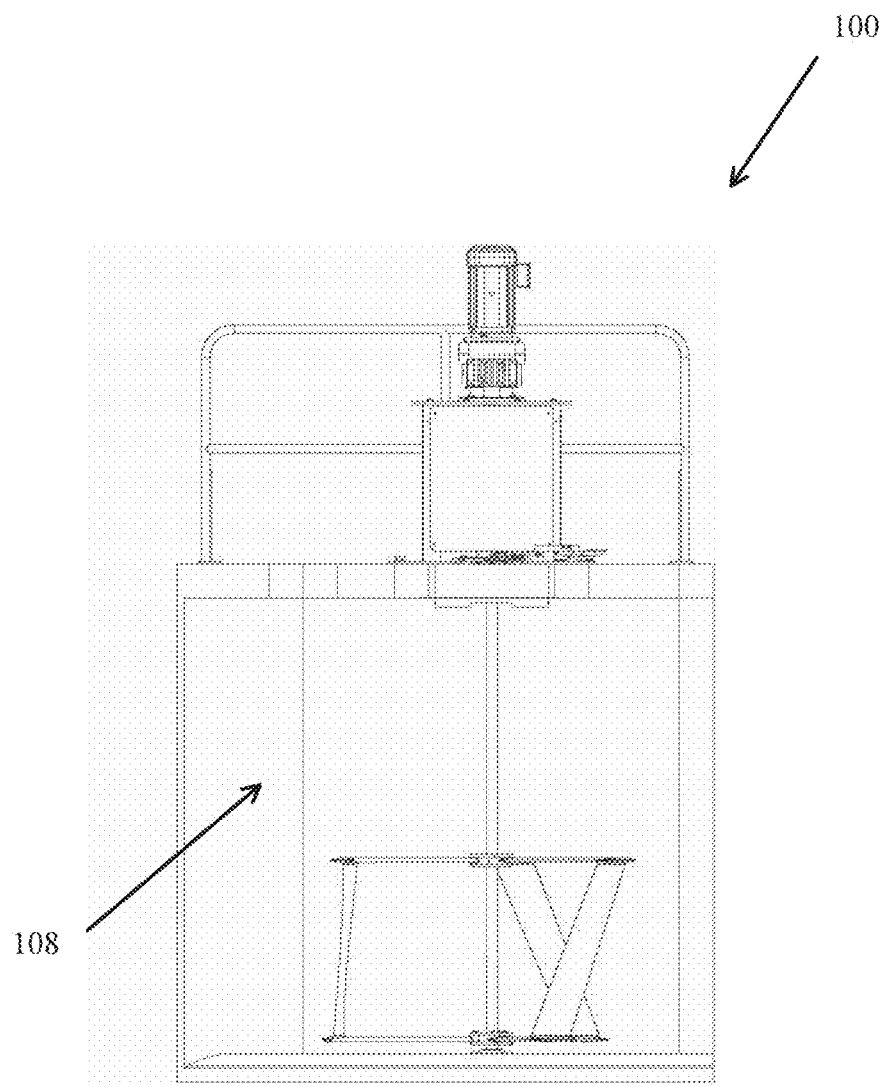
FIG. 8 is a front view of the flume system, according to one aspect of the present disclosure.

In one embodiment, FIG. 8 shows a front view of the flume system 100. As discussed above in association with the embodiment shown in FIG. 6, the apex of the accelerator wall 108 extends into the area of the flume system 100 through which water flows. In particular embodiments, this narrows the width of the flume system and increases the velocity of the water flowing through the flume.

Figure 9:
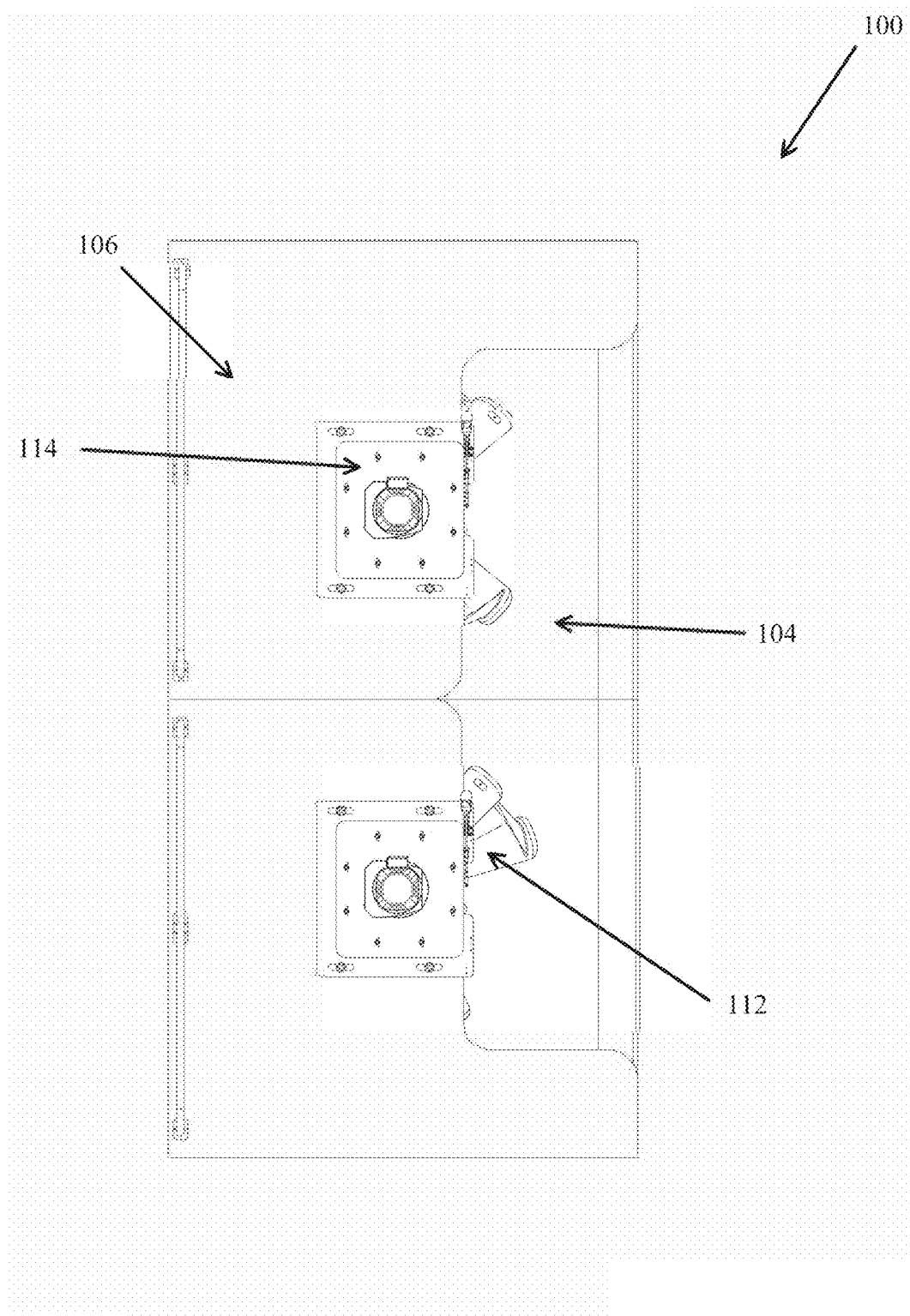
FIG. 9 is a top view of the flume system, according to one aspect of the present disclosure.

FIG. 9 is a top view of the flume system 100, according to one aspect of the present disclosure. As discussed in association with the description of FIG. 3, the top wall 106 of the flume system may be "L-shaped," and may include cut-outs for allowing the turbines 112 and gear boxes 114 to be either vertically lowered or laterally maneuvered into a slot on the top wall 106. Furthermore, these cut-outs may position the turbines 112 to be received by the base 104, when the turbines are installed within the cut-outs.

Figure 10:
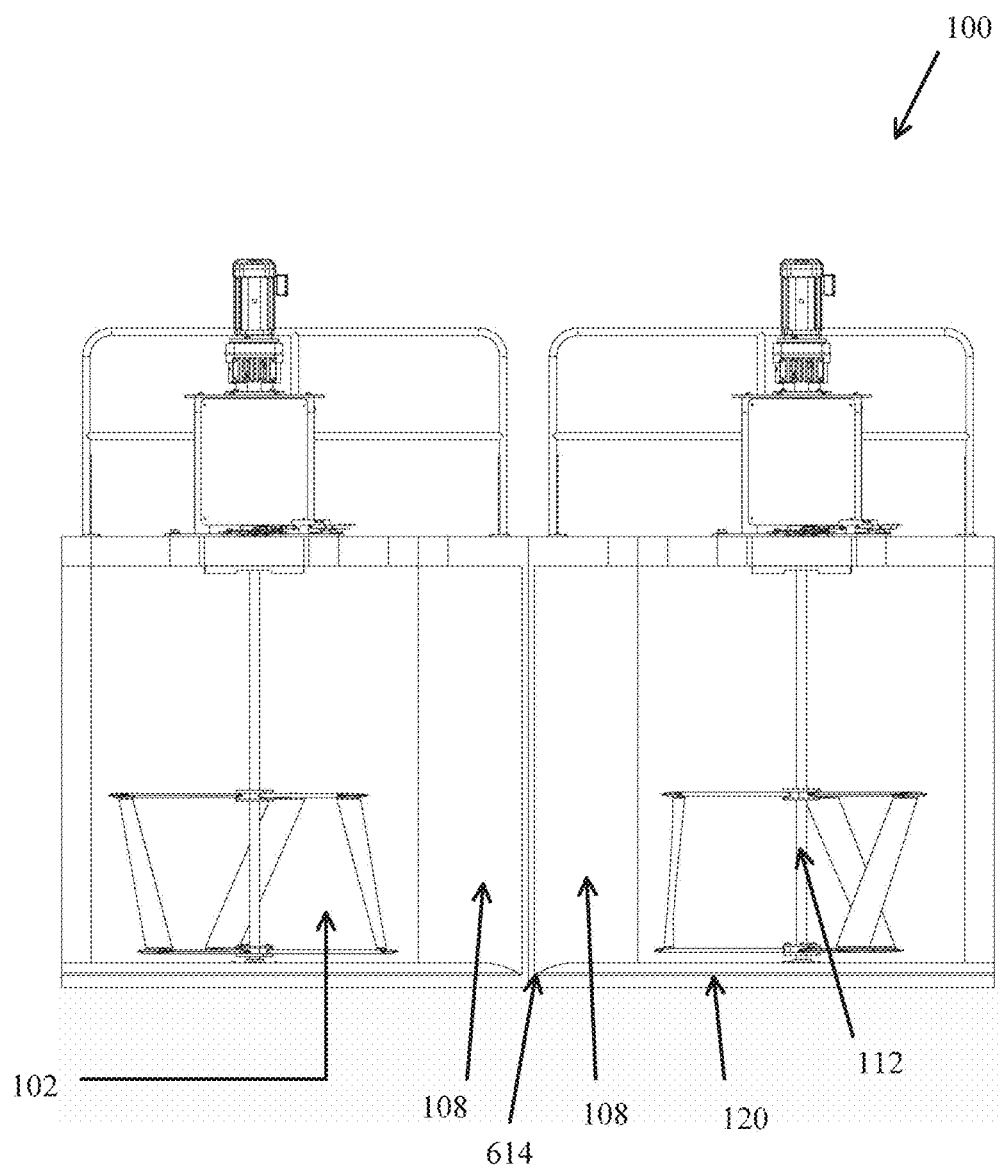
FIG. 10 is a front view of the flume system, according to one aspect of the present disclosure.

FIG. 10 is a front view of the flume system 100, according to one aspect of the present disclosure. In particular embodiments, the flume units 102 may be oriented such that the accelerator walls 108 are adjacent, rather than being positioned on opposite ends of the flume system. According to various aspects of the present disclosure, in this orientation, the accelerator walls 108 may divide a body of flowing water and accelerate each divided flow of water into their respective flume units 102 for spinning the turbines 112 and thus generating hydro-electric power. In one embodiment, the base lip 120 narrows to the front corner of the accelerator wall 108, and may further accelerate the water through the flume.

Figure 11:
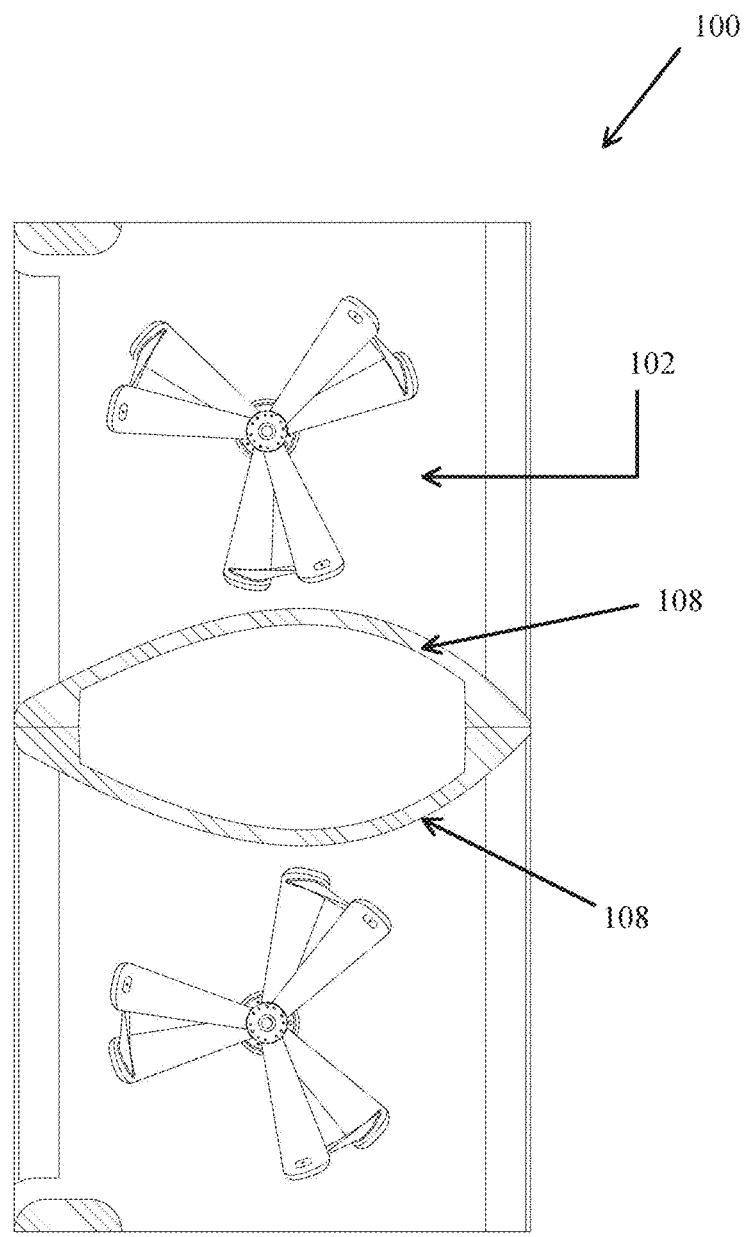
FIG. 11 is a top view of the flume system, according to one aspect of the present disclosure.

In various embodiments, FIG. 11 is a top cross-sectional view of the flume system 100. In particular embodiments, the flume units 102 may be oriented such that the accelerator walls 108 are adjacently positioned, rather than being positioned on opposite ends of the flume system 100. In various embodiments, in this orientation, the accelerator walls 108 may divide or split a body of flowing water while also accelerating each divided flow of water into their respective flume units 102.

CONCLUSION

While various aspects have been described in the context of a certain embodiments, additional aspects, features, and methodologies of the claimed systems and methods will be readily discernible from the description herein, by those of ordinary skill in the art. Many embodiments and adaptations of the disclosure and claimed systems and methods other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and methods. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and methods. In addition, some steps may be carried out simultaneously, contemporaneously, or in synchronization with other steps.

The embodiments were chosen and described in order to explain the principles of the claimed systems and methods and their practical application so as to enable others skilled in the art to utilize the systems and methods and various embodiments and with various modifications as are suited to the particular use contemplated. Alternative embodiments will become apparent to those skilled in the art to which the claimed systems and methods pertain without departing from their spirit and scope. Accordingly, the scope of the claimed systems and methods is defined by the appended claims rather than the foregoing description and the exemplary embodiments described therein.

What is claimed is:

1. A waterway turbine system comprising:
a base comprising:
a front edge positioned to receive water, wherein the front edge comprises a convex curvature along an uppermost portion of the front edge;
a back edge positioned to release water, wherein the back edge comprises a convex curvature along an uppermost portion of the back edge;
a top;
a vertical turbine extending from the top to the base;
a side wall extending upwardly from a left or right side of the base and fixed to the top, the side wall comprising a curvature that extends from the front edge to the back edge for increasing a velocity of a fluid flowing over the base, wherein the curvature comprises an apex positioned closer to the front edge of the base than the back edge of the base, and
wherein the vertical turbine is positioned at about a midpoint from the front edge and the back edge of the base and the apex is positioned closer to the front edge of the base than the back edge of the base, thereby creating an offset between the vertical turbine and the apex.

2. The waterway turbine system of claim 1, wherein the vertical turbine is positioned further from the front edge than the apex by a factor of about 1.14.

3. The waterway turbine system of claim 2, wherein:
the side wall and the base form:
a front corner at the intersection of the front edge of the base and the side wall; and
a back corner at the intersection of the back edge of the base and the side wall; and
an angle of the side wall curvature relative to the front corner is greater than an angle relative to the back corner.

4. The waterway turbine system of claim 3, wherein a front angle of the side wall is about 27 degrees relative to the front corner of the base and a back angle of about 23 degrees relative to the back corner of the base.

5. The waterway turbine system of claim 4, wherein the angle of the side wall curvature relative to the front corner is greater than the angle relative to the back corner by a factor of about 1.2.

6. The waterway turbine system of claim 5, wherein:
the front edge of the base comprises a length;
the base, the side wall, and the top form an interior; and
the apex extends into the interior about 0.23-0.25 times the length of the front edge.

7. The waterway turbine system of claim 6, wherein:
the side wall extends upwardly from the right side of the base;
the waterway turbine system comprises a second wall extending upwardly from the left side of the base; and
the second wall is substantially flat and perpendicular to the base.

8. The waterway turbine system of claim 6, wherein:
the side wall extends upwardly from the left side of the base;
the waterway turbine system comprises a second wall extending upwardly from the right side of the base; and
the second wall is substantially flat and perpendicular to the base.

9. The waterway turbine system of claim 6, wherein the base, the side wall, and the top are a unitary structure.

10. The waterway turbine system of claim 6, wherein the base, the side wall, and the top comprise thermoformed plastic structures.

11. The waterway turbine system of claim 6, wherein the base, the side wall, and the top comprise a filled mesh.

12. The waterway turbine system of claim 6, wherein the base, the side wall, and the top comprise concrete.

13. The waterway turbine system of claim 6, wherein the base and the side wall comprise concrete and the top comprises metal.

14. A waterway turbine system comprising:
a base comprising:
a front edge positioned to receive water, wherein the front edge comprises a convex curvature along an uppermost portion of the front edge;
a back edge positioned to release water, wherein the back edge comprises a convex curvature along an uppermost portion of the back edge;
a side wall extending upwardly from a left or right side of the base and comprising a curvature that extends from the front edge to the back edge with an apex for increasing a velocity of a fluid flowing over the base;
a top integrally formed with the side wall; and
a vertical turbine extending from the top to the base,
wherein the vertical turbine is positioned at about a midpoint from the front edge and the back edge of the base and the apex is positioned closer to the front edge of the base than the back edge of the base, thereby creating an offset between the vertical turbine and the apex.

15. The waterway turbine system of claim 14, wherein the vertical turbine is positioned further from the front edge than the apex by a factor of about 1.14.

16. The waterway turbine system of claim 14, wherein:
the side wall and the base form:
a front corner at the intersection of the front edge of the base and the side wall; and
a back corner at the intersection of the back edge of the base and the side wall; and
an angle of the side wall curvature relative to the front corner is greater than an angle relative to the back corner.

17. The waterway turbine system of claim 16, wherein a front angle of the side wall is about 27 degrees relative to the front corner of the base and a back angle of about 23 degrees relative to the back corner of the base.

18. The waterway turbine system of claim 16, wherein the angle of the side wall curvature relative to the front corner is greater than the angle relative to the back corner by a factor of about 1.2.

19. The waterway turbine system of claim 14, wherein:
the front edge of the base comprises a length;
the base, the side wall, and the top form an interior; and
the apex extends into the interior about 0.23-0.25 times the length of the front edge.

20. The waterway turbine system of claim 14, wherein:
the side wall extends upwardly from the right side of the base;
the waterway turbine system comprises a second wall extending upwardly from the left side of the base; and
the second wall is substantially flat and perpendicular to the base.

21. The waterway turbine system of claim 14, wherein:
the side wall extends upwardly from the left side of the base;
the waterway turbine system comprises a second wall extending upwardly from the right side of the base; and
the second wall is substantially flat and perpendicular to the base.

* * * * *